Nov. 24, 1953 J. H. HAMMOND, JR., ET AL 2,660,616

TELEVISION STILL PICTURE RECEIVER

Filed Dec. 6, 1950

6 Sheets-Sheet 1

Inventors
JOHN HAYS HAMMOND, JR.
ELLISON S. PURINGTON.
By
Attorney

Inventors
JOHN HAYS HAMMOND, JR
ELLISON S. PURINGTON.
By
Attorney

TELEVISION STILL PICTURE RECEIVER

Filed Dec. 6, 1950

Inventors

JOHN HAYS HAMMOND, JR.

ELLISON S. PURINGTON.

By [signature]

Attorney

Nov. 24, 1953 J. H. HAMMOND, JR., ET AL 2,660,616

TELEVISION STILL PICTURE RECEIVER

Filed Dec. 6, 1950 6 Sheets-Sheet 4

Inventors
JOHN HAYS HAMMOND, JR.
By ELLISON S. PURINGTON.

Attorney

Nov. 24, 1953

J. H. HAMMOND, JR., ET AL 2,660,616

TELEVISION STILL PICTURE RECEIVER

Filed Dec. 6, 1950

6 Sheets-Sheet 5

Inventors
JOHN HAYS HAMMOND, JR.
ELLISON S. PURINGTON.
By
Attorney

Nov. 24, 1953 J. H. HAMMOND, JR., ET AL 2,660,616

TELEVISION STILL PICTURE RECEIVER

Filed Dec. 6, 1950

6 Sheets-Sheet 6

Inventors
JOHN HAYS HAMMOND, JR.
ELLISON S. PURINGTON.

By

Attorney

Patented Nov. 24, 1953

2,660,616

UNITED STATES PATENT OFFICE 2,660,616

TELEVISION STILL PICTURE RECEIVER

John Hays Hammond, Jr., and Ellison S. Purington, Gloucester, Mass.; said Purington assignor to said Hammond, Jr.

Application December 6, 1950, Serial No. 199,534

8 Claims. (Cl. 178—7.4)

This invention relates to a television receiving system which provides for extracting a plurality of still pictures from the transmitted material received on a television picture screen, and projecting them in repeated sequence for an extended period of time upon a screen which is independent of the television picture screen.

One of the objects of this invention is to make especially noteworthy news and pictorial material available subsequent to the use of a television channel for its transmission.

Another object is to provide news and pictorial material which can be observed at the convenience of the spectators, at a time subsequent to its transmission.

Another object is to provide advertisers with a much greater effective period of advertising time than that required for the transmission of their advertising material.

In a co-pending application Serial No. 199,533, filed December 6, 1950 for "Transmitter System" has been shown a transmitter system for sending a plurality of still pictures in quick succession, subsequent to the transmission of a distinctive control signal on the same video channel which later transmits the still pictures.

In the present invention, receiving means is provided for initiating the operation of special receiver circuits in response to the transmitted control signal, recording the plurality of pictures at times when they are being sent, processing the recordings and subsequently projecting the processed recordings upon a screen in repeated succession.

The invention further provides that when a new set of pictures is transmitted, the pictures which have been displayed due to the preceding transmissions will be discontinued, and the projecting device be so reset that the first recorded picture of the new set will be the first to be projected.

The invention also consists in certain new and original features of construction and combinations of parts hereinafter set forth and claimed.

The nature of the invention as to its objects and advantages, the mode of its operation and the manner of its organization, may be better understood by referring to the following description, taken in connection with the accompanying drawings forming a part thereof, in which Fig. 1 is a front elevation of the upper part of receiver system in accordance with this invention;

Like reference characters denote like parts in the several figures of the drawing.

In the following description parts will be identified by specific names for convenience, but they are intended to be generic in their application to similar parts.

Figure 1:
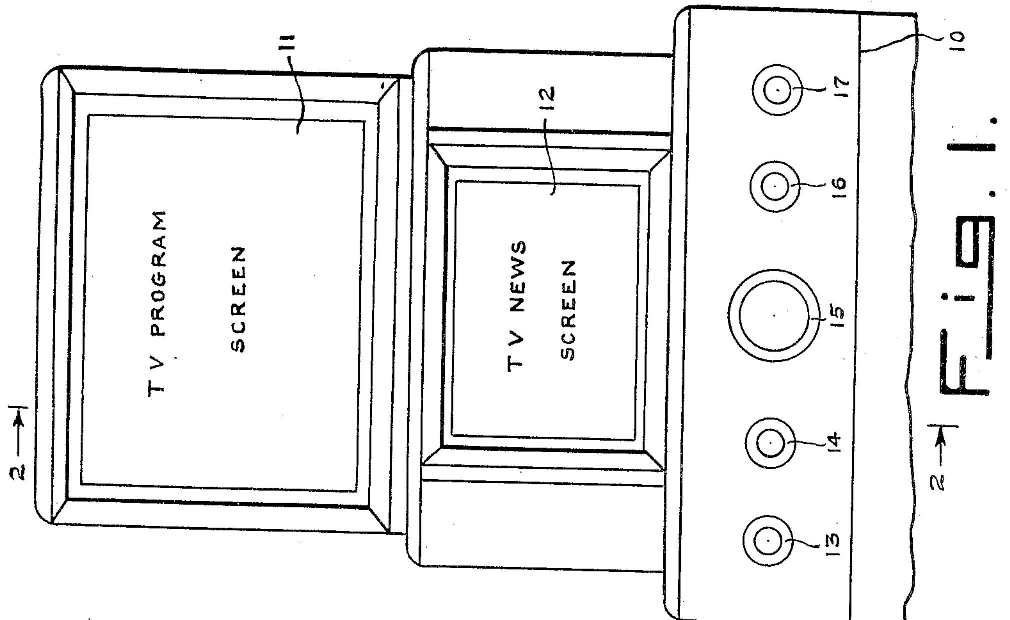

In Fig. 1, showing the front elevation of the upper part of a typical receiver system, the main TV chassis 10 is at the bottom of the figure, and the TV program screen 11 upon which normal television programs appear is at the top. Between is a smaller screen 12 upon which the still picture material designated "TV News" appears subsequent to its momentary appearance on the upper screen. On the vertical panel of the chassis 10 appear the customary controls and indicating devices 13 to 17 for properly tuning in the TV program which carries the TV news material.

Figure 2:
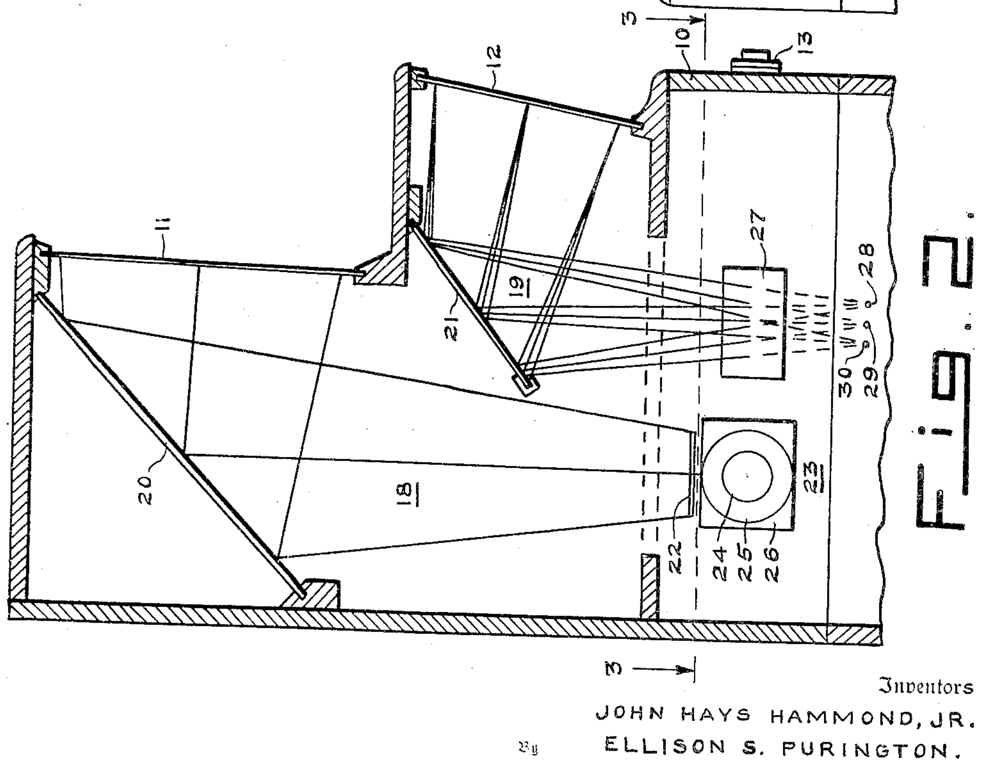
Fig. 2 is a vertical section taken in section on line 2—2 of Fig. 1 showing the optical parts and the beams carrying the usual television programs and the special still picture for television news purposes.

On Fig. 2, showing schematically a cross sectional view of Fig. 1, taken from the side, the locations of elements 10 to 17 of Fig. 1 are shown, together with vertically rising optical beams 18 and 19 for the TV program and the TV news screens, together with reflecting mirrors 20 and 21 by which the beams are directed to the screens. The beam for TV program purposes is shown as starting at the corrective lens 22 of a Schmidt type projector 23, utilizing a kinescope symbolized by circle 24 with axis in the horizontal plane, a concave mirror symbolized by circle 25 and a plane mirror at 45° symbolized by square 26. A projector system of this type is described by Boyle and Doll, "Compact projection television system," in Electronics, April 1948, This projection system is a well known article of commerce, and need not be described in further detail, except as to features of the concave mirror 25 discussed below. The vertical beam for the TV news screen is shown as originating in a plane mirror 27, mounted with its surface at an angle of 45° to make a 90° bend in a beam travelling in a horizontal direction. Although three sets of lines are shown, all reaching the same position in the TV news screen, they diverge from separate sources 28, 29, and 30. These symbolize points within three separate projection lenses for the three individual still pictures of a set, and it will be understood that at a given time, only one of the three parts of the beam is operative.

Figure 3:
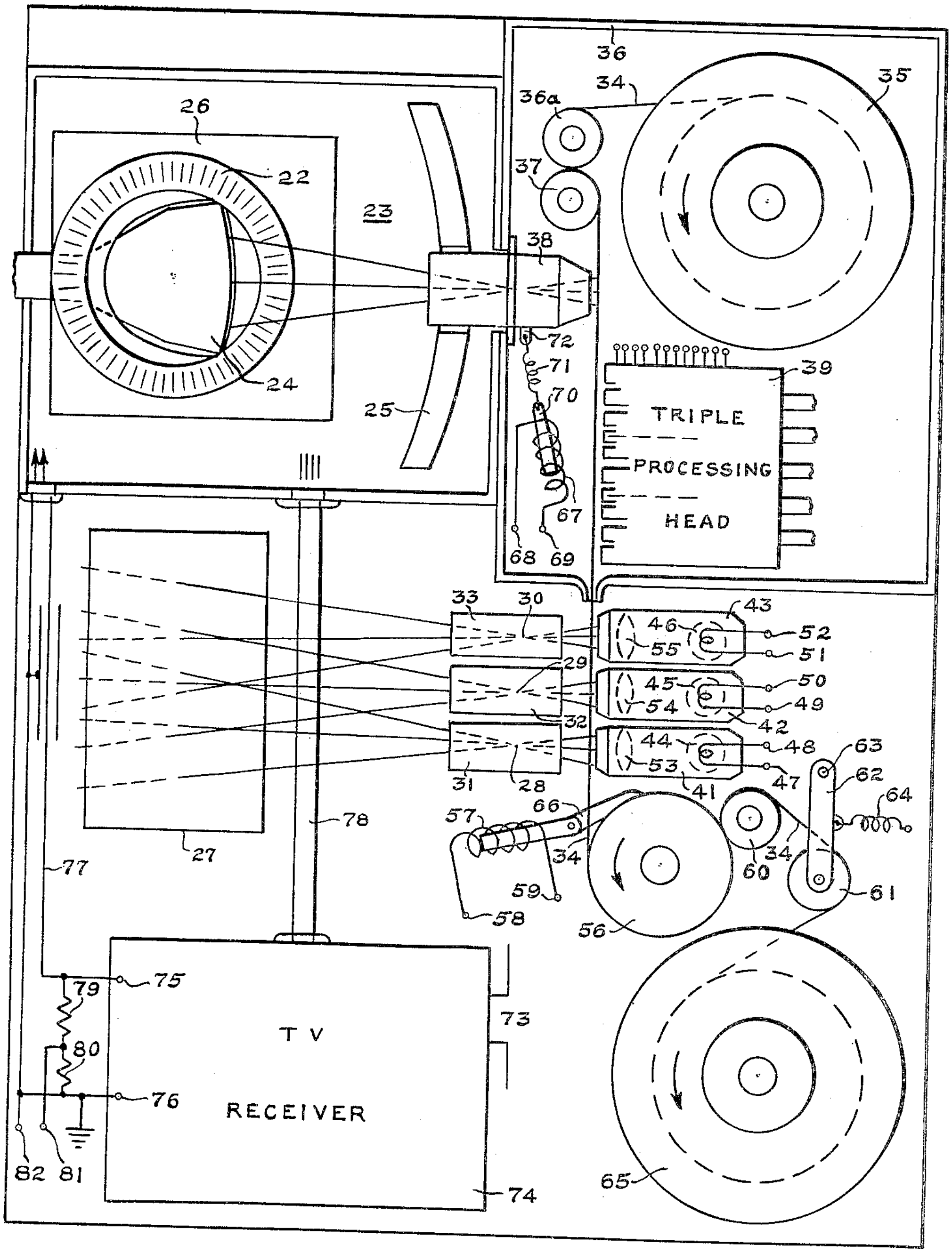
Fig. 3 is a horizontal section taken on the line 3—3 of Fig. 2 looking down onto a part of the electronic chassis from which the beams rise for the two screens of the prior figures.

With reference to Fig. 3, which is a view looking down into the chassis, the elements 22, 24, 25, 26 of the projection system 23 are shown, also the mirror 27 for the TV news beam. Here the horizontal part of the TV news beam is shown with the points 28, 29, 30 at cross over points within projection lenses 31, 32, 33 respectively, with axes in the horizontal plane.

In the present arrangement, the still pictures are recorded on a continuous film 34, initially stored on a reel 35 within a light proof compartment 36 which is suitably attached to the projection assembly 23. This film 34 is threaded between rollers 36a and 37, thence in front of a recording lens 38 with iris and shuter not shown, the lens barrel being inserted through a hole in the concave mirror 25 of the projection system to accept pictures from the face of the kinescope 24 and force them on the film when the shutter is opened. Thence the film passes in front of a processing head 39 of the type described by Tuttle and Brown, Society of Motion Picture and Television Engineers, February 1950, except that it is arranged only for processing pictures, and that provisions are made for processing three pictures at the same time. For this purpose three individual processing heads may be made up in one single block, suitably heated and controlled as to temperature by electrical heaters and thermostats, and provided with suitable valves not shown in parallel for passing developer, fixed, wash water and drying air in turn over the part of the film being processed. Thence the film passes through an opening 40 in the light-proof chamber 36; and passes between the three projection lenses 28, 29, 30 and their corresponding light sources 41, 42, 43. These latter include lamps 44, 45, 46, with terminals 47, 48, 49, 50, 51, 52 respectively and condensing lenses 53, 54, 55 respectively. Thence the film passes around a pull-up wheel 56 which may be advanced by a solenoid 57 with terminals 58 and 59. Thence it passes around rollers 60 and 61, the latter being arranged with its center pin mounted on an arm 62 pivoted at 63 and held against the film 34 by a spring 64. Thence the film 34 passes around a wind-up reel 65.

The storage reel 35 and the rollers 36a and 37 are so constructed as to provide sufficient friction that the film will not be advanced excessively when the pull-up wheel 56 is actuated. The wind-up reel may be driven from a motor with slipping clutch, or may be driven from the pull-up wheel 56.

The pull-up wheel assembly is driven by the arm 66 which engages a circular ratchet wheel not shown. It will be understood the solenoid 57 is self restoring at the end of each impulse on terminals 58 and 59, by a spring device not shown.

The construction is such that the pull-up assembly advances the film accurately by a definite amount such as five sprocket holes in a standard film. It will be understood that the various parts will be suitably located so that the centers of the latent images will register properly with respect to the centers of the orifices in the processing head; and so that the processed pictures on the film will register correctly between a condenser lens and its corresponding projection lens. Thus for example, when the first latent image of a set is produced in front of the recording lens, it will require four operations of the pull-up wheel to place this latent image in front of the forwardmost processing orifice. After processing it will require four operations of the pull-up wheel to place the film picture in registry with the forwardmost projection system. Thus for each set of pictures, the pull-up wheel operates eight times, four being prior to processing, and four after processing.

The shutter is operable by an electric solenoid 67 with electrical terminals 68 and 69, and with a moving core 70 coupled by spring 71 to the shutter arm 72. It will be understood that the shutter is of the type where the cocking and tripping of the shutter is effected by one motion; that the shutter may be timed to be open very closely for an integral number of television frames such as three, that the shutter system is self-restoring upon discontinuance of current through terminals 68 and 69.

The distance between centers of the processing orifices of head 39 and the distances between centers of the light supply assemblies 41, 42, and 43 are accurately set to correspond to the pull-up distance provided by each stroke of solenoid 57. However the distance between centers of the projection lens systems 31, 32, 33 are slightly less so that the projected images will occupy the same area of the screen 12 of Figs. 1 and 2, regardless of which image is being projected.

The transmitted television picture into which the three still pictures, preceded by a distinctive control signal, have been inserted, as described for example in co-pending application above referred to, is picked up by an antenna 73, and fed to a television receiver 74 of conventional construction, but provided with video output terminals 75 and 76 connected by a shielded line 77 to the control grid of kinescope 24 by wires associated with the box 23 not shown. Also the receiver is connected by cable 78 to the kinescope system which carries current for focusing coils, deflection coils, heaters and cathodes, also not shown. The system differs from that of a standard projection type receiver in that terminals 75 and 76 are available for driving a circuit which supplies operating current for shutter solenoid 67, pull-up solenoid 57 and the projection lamps 44, 45, and 46 at suitable times. For this purpose, hot video terminal 75 is connected through resistors 79, 80 in series to the grounded video terminal 76, and an external terminal 81 is connected to the junction of resistors 79 and 80, while external terminal 82 is connected to the ground terminal 76. These terminals are connected to similarly numbered terminals of Fig. 4 by wires not shown.

It is seen that Fig. 3 shows all the electrical elements of the system except the timing circuits by which the two solenoids and the three lamps are properly operated. Many varieties of timers can be constructed for such purposes, and these are illustrated by the forms disclosed in Figs. 4, 5, 6 taken in connection with the timing diagram of Fig. 7.

Three separate timers are indicated, first a high speed timer which provides for alternate operations of the shutter solenoid 67 to take the picture and of the pull-up solenoid 57 to advance the film and ultimately bring the three latent images in registration with the orifices of the processor head. A medium speed timer is then required to operate the valves for the developing, fixing, washing, drying operation, and finally to provide four pull-ups of solenoid 57 to bring the developed images into registration with the projection systems. Finally a low speed timer is required to control the illumination of the lamps to project the pictures in repeated sequence. It is important that the high speed timer be set into operation a definite time after the initial reception of the control signal, so that the three latent images will properly be a record of the three pictures transmitted. For this purpose an electrical control system is chosen such as described in the co-pending application above referred to permitting the construction of a receiving circuit free from disturbances from the content of the regular video program, and which will provide accurate initiation of the high speed timer. The timer itself is of the electronic counter type, driven from 60 cycle current sufficiently synchronous with the similar counter in the transmitter. For the medium and slow speed timers, self-starting synchronous motors are used. The motor for the medium speed timer runs a definite period after being set in motion. At the conclusion of this period the first timer runs continuously, except that when the medium speed motor starts to operate, the low speed timer motor first speeds up to complete its cycle quicker than normal, and stops until the medium speed motor shuts off. In this slow speed projection timer, provision is made for cutting supply current for the projection lamps immediately on start of the processing timer, and restoring it when the processing timer stops.

Figure 4:
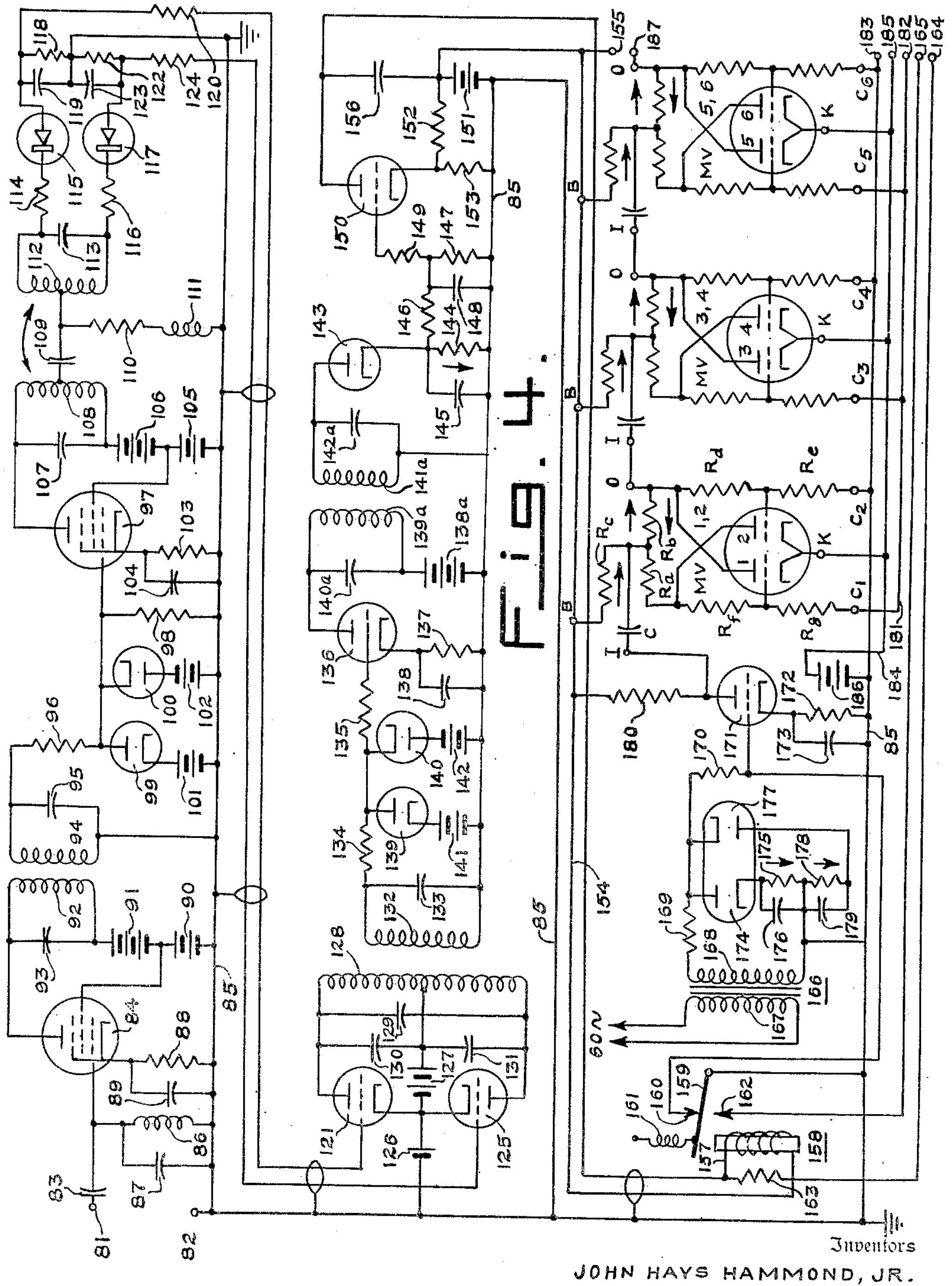
Fig. 4 is a schematic diagram showing the electrical circuits of the receiver, mainly relating to initiating the recording operation of the receiver.

The circuits of Fig. 4 are constructed assuming the control signal is of the type in the co-pending application above referred to. This signal comprises a video frequency wave which is shifted at an audio rate between two frequency values. The values and the rate are harmonics of the horizontal and the vertical sweep frequencies, respectively, so that during the short interval of transmission, a stationary pattern corresponding to the control signal appears on the TV program screen.

In Fig. 4, the input terminals 81 and 82 are connected to the like numbered terminals of Fig. 3. The terminal 81 is connected through capacitor 83 to the grid of a pentode tube 84, between which and ground line 85 is connected an inductor 86 and a capacitor 87 in parallel and broadly tuned to the mean of the frequency band of the control signal. Input terminal 82 is connected to the ground line. The pentode 84 has the usual cathode biasing resistor 88 and capacitor 89, and screen and anode batteries 90 and 91 and its output circuit comprises primary 92, condenser 93, secondary 94 and condenser 95, suitably coupled to give selective response to all the constituents of the control signal and discriminate against all other signals in the video circuits of the receiver. This coupled circuit system operates through resistor 96 onto the grid of a pentode 97, which in turn is connected to ground line 85 by resistor 98. The grid swing is limited by clipper diodes 99, 100 biased by batteries 101 and 102 so that the grid swing is substantially the same regardless of the value of the amount of control signal at input terminals 81, 82. The pentode 97 has associated cathode bias resistor 103 and capacitor 104, and screen and anode batteries 105 and 106 and may be arranged also to serve as a limiter device. The output of this pentode operates into a tuned circuit comprising capacitor 107 and inductor 108, the center tap of which is connected to one end of a blocking capacitor 109, the other end of which is connected to ground through resistor 110 and inductor 111, and also is connected to the center tap of secondary coil 112 which has mutual inductance with primary coil 108. Across the coil 112 is connected a tuning capacitor 113, one end of which is connected through a resistor 114 to the cathode of a diode detector 115 and the other end of which is connected through a resistor 116 to the cathode of a diode detector 117. The anode of diode 115 is connected to ground through resistor 118 shunted by capacitor 119, and is connected through resistor 120 to the grid of an audio amplifier triode 121; similarly the anode of diode 117 is connected to ground through resistor 122 shunted by capacitor 123, and is connected through resistor 124 to the grid of an audio amplifier triode 125. The arrangement of the circuits between pentode 97 and the diodes 115 and 117 is that of a discriminator, which distributes impressed energy close to one of the horizontal sweep harmonics to one detector, and energy close to the other harmonic to the other detector, so that the output audio signals are of the same frequency corresponding to the chosen harmonic of the vertical sweep frequency. They are, however, out of phase, and therefore the triodes 121 and 125 are connected in push pull manner. These triodes have a common cathode bias battery 126 and plate battery 127, with center tapped output coil 128 paralleled by capacitor 129, and with the plate ends of the inductor connected to the center tap by capacitors 130 and 131. This output system is tuned to the audio frequency of the control signal. It serves as a selective limiter since increase of the output of the discriminator produces greater D. C. flow through the resistors 118 and 122 to increase the bias and reduce the gain of the audio amplifier. This output circuit is loosely coupled to a circuit comprising inductor 132 and capacitor 133, tuned to the audio frequency, with one end connected through resistors 134 and 135 to the grid of a triode 136 suitably biased by cathode resistor 137 and capacitor 138. The other end is connected to ground line 85. Bridged across the input to tube 136 between the junction of resistors 134 and 135 and the ground line 85 is a pair of clipping diodes 139 and 140 arranged with bias batteries 141 and 142 to limit the A. C. value of the input to the triode. The output of the triode 136 powerized by battery 138a comprises a coupled circuit selective transformer with primary inductor 139a and capacitor 140a and secondary inductor 141a and capacitor 142a. One end of each of the secondary elements 141 and 142 is connected to ground line 85, while the other ends are connected to the anode of a rectifier 143, the cathode of which is connected to ground line 85 through resistor 144 shunted by capacitor 145, and is also connected through resistor 146 and 147 to ground line 85. The junction of these two resistors is connected to ground by capacitor 148, and is connected through resistor 149 to the grid of a relay tube 150, anode power for which is supplied by a battery 151, the negative end of which is connected to ground line 85. The positive end of battery 151 is connected through resistor 152 to the cathode of triode 150, which in turn is connected to ground through resistor 153; it is also connected to high voltage line 154 and output terminal 155. Between the anode of triode 150 and the positive end of battery 151 is connected a capacitor 156 and the winding 157 of a relay 158. This relay has an armature 159 connected to ground line 85, normally held against a back contact 160 by a spring 161, and has a front contact 162.

Figure 7:
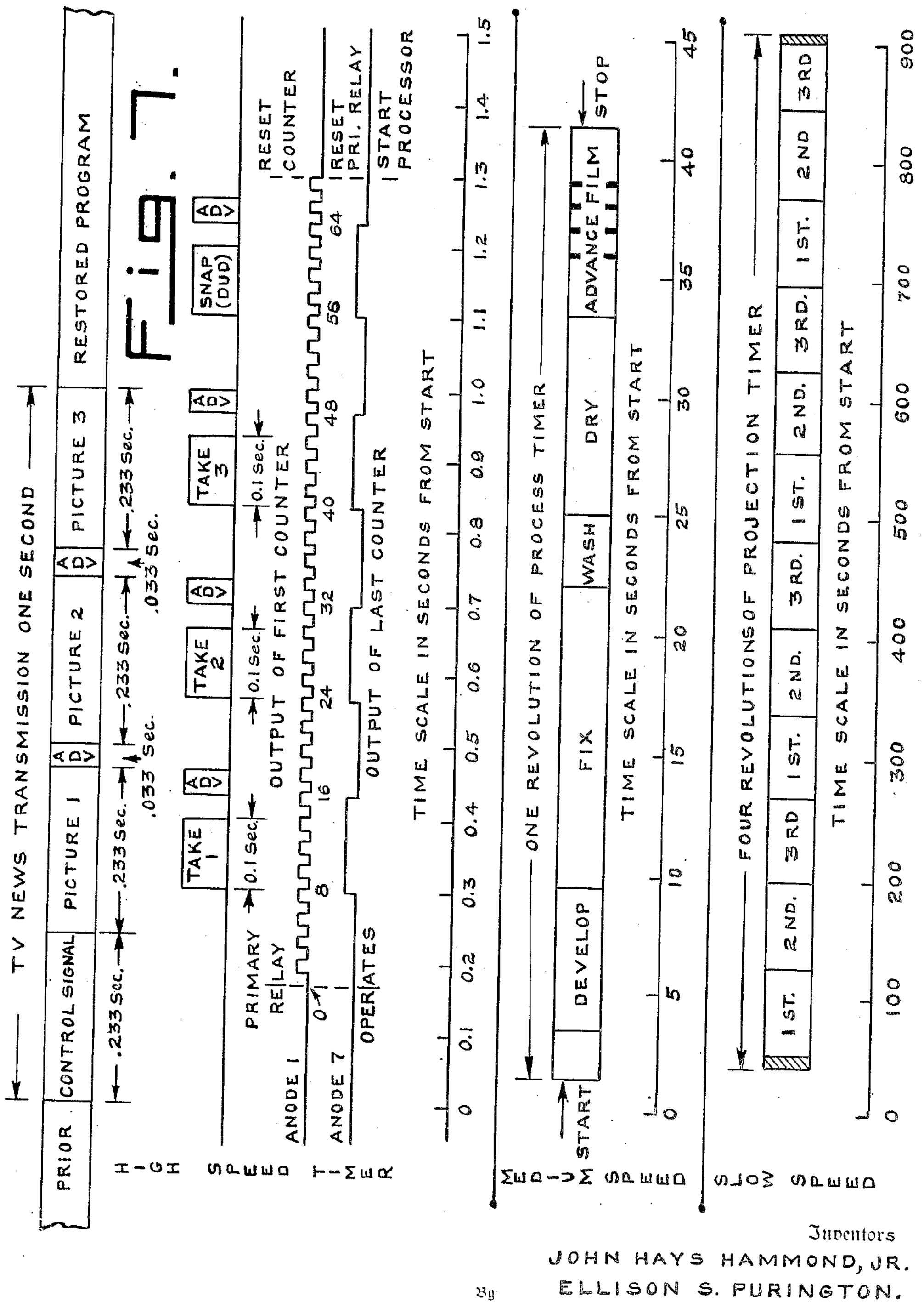
Fig. 7 is a chart showing the timing relationships of various operations in accordance with the invention.

The circuits of Fig. 4 so far described provide for amplifying, limiting, amplifying and push-pull detecting, the video frequency energy corresponding to the control signal in well known manners. The recorded audio signal output of both detectors is combined additively in a selective amplifier, limited, selectively amplified, and impressed upon a rectifier system to produce control voltage for the relay tube and relay. Because of the limiting actions imposed upon the control signals, the audio signal impressed upon the rectifier 143 is substantially independent of the amount of control signal impressed upon pentode 84, assuming the main television controls have been set so that a reasonably proper intensity and contrast has been obtained for the TV program presentations. Moreover the selectivity features of the circuit make the input to the rectifier 143 fairly completely free from undesired disturbances. Accordingly the build up time of the rectifier output circuit 144 to 149 between the start of the control signal and the actuation of the relay 158 is quite definite. The circuits may be so arranged that this time interval is of the order of 5 TV frames, as indicated in the chart of Fig. 7.

The anode of triode 150 is also connected through resistor 163 to the terminal 164, and the front contact 162 of relay 158 is connected to the terminal 165. Thus after closure of the relay 158, if the terminals 164 and 165 are connected together current flows to ground from the positive end of battery 151, through the winding 157 of the relay and resistor 163, and this is of sufficient magnitude to hold the relay closed after the control signal has ceased. The relay will be restored however, when the connection between terminals 164 and 165 is subsequently broken, to reset the relay system for operation by a subsequent control signal.

The function of the relay 158 is to initiate an electronic counter system for operating the shutter and pull-up solenoids of Fig. 3. The counter is supplied with a driving square wave pulse train from a transformer 166, the primary 167 of which is connected to a 60 cycle source or may be driven from the vertical sweep frequency of the television receiver system. One end of the secondary 168 is connected to ground line 85, while the other is connected through resistors 169 and 170 to the grid of a counter driver triode 171, the cathode of which is biased positively with respect to ground by current through resistor 172 shunted by capacitor 173. Between the junction of resistors 169 and 170 and ground line 85 is bridged a positive clipper comprising diode 174 in series with resistor 175 shunted by capacitor 176, and a negative clipper comprising diode 177 in series with resistor 175 shunted by a capacitor 179. These clippers pass current when the voltage of the secondary 168 exceeds prescribed limits, both negative and positive, to develop a square wave across the junction of resistors 169 and 170 to ground line 85. The grid of driver 171 is connected to back contact 160 of the relay 158, the armature of which is connected to ground. When the relay is in the normal position, therefore, the grid of triode 171 is not actuated by the pulse train, but after closure of the relay by the control signal and during the period after the control signal has ceased and current is flowing in the holding resistor 163, the square wave pulse train is impressed on the counter driver triode 171. The anode of this triode is connected to the high voltage line 154 through output resistor 180, and to the input terminal I of the first of four decal counters of standard construction, three of which are shown in Fig. 4 and the remainder in Fig. 5. Counters of this type are adequately described by Grosdoff, RCA Review. It will suffice to describe but one of these units, as for example the first designated MV-1, 2. This utilizes a duo-triode tube, with two triodes designated 1 and 2 respectively, with the odd numbered tube normally passing current externally to the counter unit. Thus the terminal B of the counter is connected to the high voltage line 154, input terminal I is connected to the source of square wave and output terminal O is connected to the input terminal of the subsequent stage. The grid return terminal for the odd numbered triode, $C_1$ is connected to a reset line 181 connected to the reset terminal 182, while the grid return $C_2$ for the even numbered triode is connected to ground line 85 connected to terminal 183. The cathode terminal K for both triodes is connected to cathode line 184 connected to terminal 185 and the positive end of cathode battery 186, the negative end of which is connected to ground line 85. In addition to the six terminals B, I, O, $C_1$, $C_2$, and K there are suitable terminals, not shown, for supplying current to the heaters of the triodes, also not shown.

Within the counter unit, the anodes of the triodes 1 and 2 are connected through individual plate resistors $R_a$ and $R_b$ to a junction point which is connected through a common plate resistor $R_c$ to terminal B and is connected through a blocking capacitor C to input terminal I. The anode of triode 1 is also connected through resistor $R_d$ to the grid of triode 2, which is connected through resistor $R_e$ to the terminal $C_2$. Correspondingly, the anode of triode 2 is also connected through Resistor $R_f$ to the grid of triode 1 which is connected through resistor $R_g$ to the terminal $C_1$. The counters MV-3, 4; MV-5, 6 of Fig. 4 and MV-7, 8 of Fig. 5 are similarly constructed and designated.

The counter is set up for operation by freeing terminal 182 from external connections so that the odd numbered triodes have their grids slightly above cathode potential due to their connections to the B terminal, by the resistors $R_f$, through which grid current flows, serving as a limiter. Currents of considerable magnitude flow through the resistors $R_c$ and $R_b$ to the odd numbered anodes, as indicated, depressing the anode voltages of these tubes so that the grids of the even numbered tubes are sufficiently below cathode potential to make little or no current flow to the anodes of the even numbered tubes. When the reset line is connected to ground, there is insufficient change in the plate currents to cause counter operations. Each counter changes its conditions in response to a negative change of potential at its input terminal, but not in response to a positive change. Thus when the relay 158 closes to release the pulse train, the counter MV–1, 2 changes its condition at the instant of the first negative change at I, causing current to cease flowing to triode 1 and causing current to flow to the triode 2. The first change in the output terminal O for this counter is positive, which does not influence the second counter, but the second change in the output terminal is negative, which operates the second counter. Thus, during operation the first counter MV–1, 2 is actuated with a 60 cycle square wave input, and delivers a 30 cycle square wave output to the next counter MV–3, 4. This delivers 15 cycle square wave output to counter MV–5, 6, the output terminal of which is a 7.5 cycle square wave delivered to the output terminal connected to terminal 187 of Fig. 4. Turning now to Fig. 5, with input terminals 155, 187, 183, 185, 182, 165 and 164 connected by wires not shown to like numbered terminals of Fig. 4, the final counter MV–7, 8 is actuated by a square wave form at 7.5 cycles and delivers a square wave form of frequency 3.75 cycles.

Thus, with reference to Fig. 7, assuming the relay 158 operates to release the pulse train at an ideal instant, the output wave forms of the first and last counter will be timed as shown by the traces marked anode 1 and anode 7. Changes of potential of anode 1 in one sense or the other occur every 1/60 second, which is the counting interval. At the counts of 8, 24, 40, etc. the anode 7 changes positively, at the counts of 16, 32, 48, etc. it changes negatively. The positive changes may be used to initiate the operation of the recording solenoid 67 and the negative changes to initiate the operations of the pull-up solenoid 57. When the transmitter timing is as indicated in the diagram, corresponding to the timing schedule of co-pending application Serial No. 119,533 and the constants of the relay circuit 143 to 162 of Fig. 4 are properly adjusted, the receiving camera shutter will be opened during a time interval in the center of the picture transmissions. Since four pull-up operations are required, the fourth operation of the shutter will not be of a picture which is required, and it will not be developed or projected.

Figure 5:
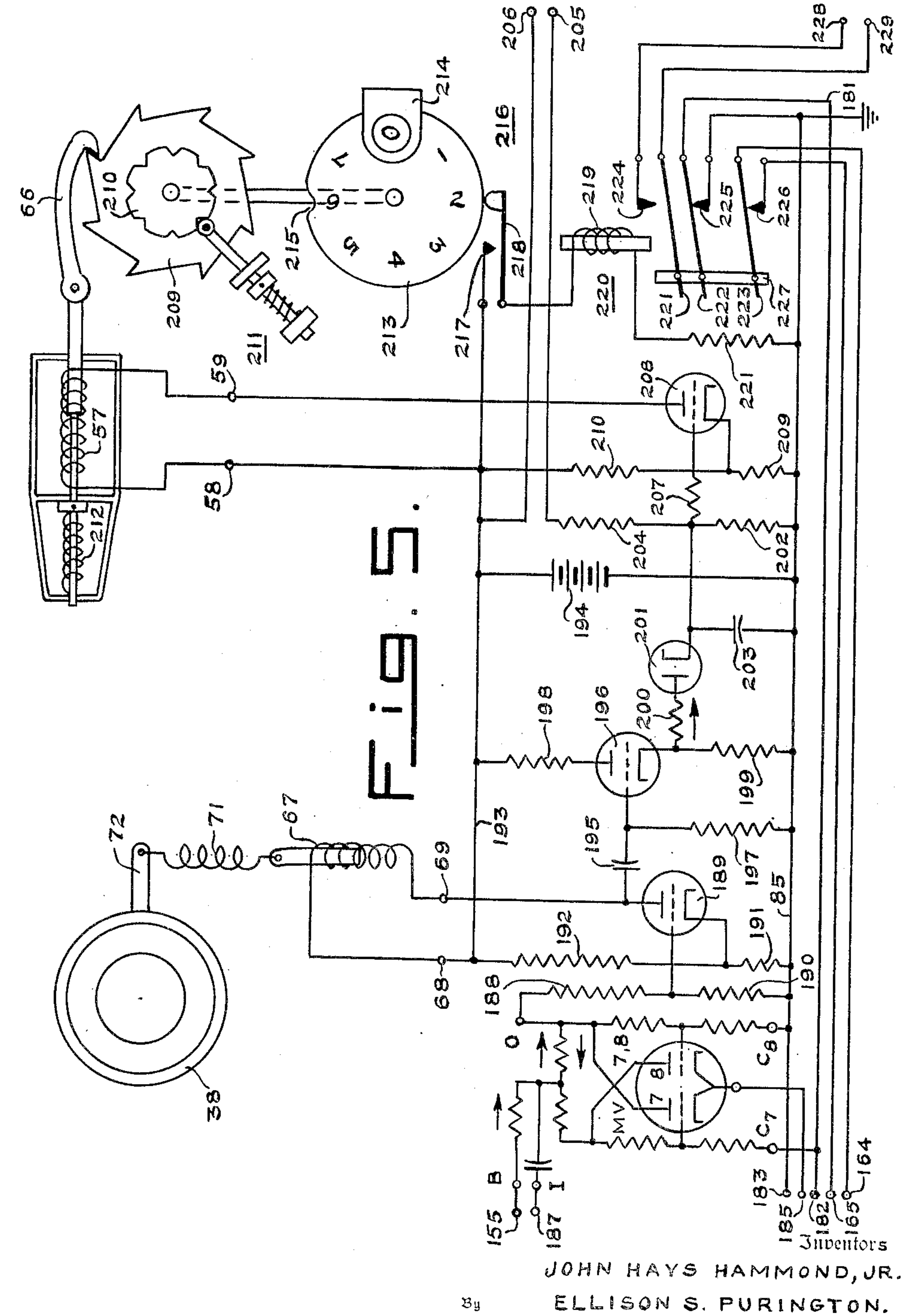
Fig. 5 is a schematic diagram showing further circuits of the receiver in continuation of Fig. 4, mainly relating to the recording operation of the receiver system.

In Fig. 5, the output terminal O of the decal counter MV–7, 8 is connected through a resistor 188 to the grid of a power triode 189, which is connected through resistor 190 to ground line 85. The cathode of triode 189 is connected through a resistor 191 to ground line 85, and through a resistor 192 to the high voltage line 193 to which the positive end of a battery 194 is connected, the negative end of which is connected to ground line 85. The anode of triode 189 is connected to terminal 69 connected to one end of the winding of the shutter solenoid 67, the other end of which is connected to terminal 68 and the line 193. The adjustments are such that when the terminal O of the counter MV–7, 8 changes positively, the triode 189 passes current to operate the solenoid, and when it goes negatively, the triode 189 passes insufficient current to hold the solenoid. Therefore the shutter of the recording lens is operated shortly after the counts of 8, 24, 40 and 58. The exposure time being .1 second corresponding to six counts, the solenoid is released at the counts of 16, 32, 48 and 64 after the shutter has closed, and each time the shutter is reset for the next operation.

To operate the pull-up solenoid, use is made of the wave form at the anode of tube 189, which drops in potential when the shutter solenoid pulls in, but increases in potential when the shutter is released at the counts of 16, 32, 48 and 65. For this purpose, the anode of triode 189 is connected through capacitor 195 to the grid of triode 196, which in turn is connected through resistor 197 to ground line 85. The operation of the prior circuits causes an elongated positive pulse to be applied to the grid of triode 196 just after the release of the shutter solenoid 67, which is utilized to operate the pull-up solenoid 57. The circuit for this purpose also provides for operation of the pull-up solenoid after the processing of the film, to bring it into the projection system. The triode 196 has its anode connected through a resistor 198 to high voltage line 193, this resistor being of low value since the plate output voltage is not utilized. The cathode is connected to ground through resistor 199, and through resistor 200 to the anode of a unidirectional conductor 201, the cathode of which is connected through a resistor 202 shunted by capacitor 203 to the ground line 85. The cathode is also connected through a resistor 204 to a terminal 205 adjacent to a terminal 206 connected to the high voltage line 193. The cathode is also connected through a resistor 207 to the grid of a power triode 208, the cathode of which is connected through resistor 209 to ground line 85 and through resistor 210 to the high voltage line 193. The anode of triode 208 is connected through terminal 59 to the one end of the winding of solenoid 57, the other end of which is connected through terminal 58 to the high voltage line 193. The arrangements are such that when there is no pulse through capacitor 195, the current through diode 201 and thence to ground through resistor 202 is insufficient to cause enough current to flow in the winding of the solenoid 57 to cause it to operate. When, however, the anode of triode 189 swings positive, at the timer counts of 16, 32, 48, 64, the resulting pulse through capacitor 195 is sufficiently great and the time constant of the circuit 195, 197 sufficiently long that the voltage across resistor 202 and smoothing capacitor 203 becomes sufficiently great to cause operation of the triode 208 to operate the solenoid 57. This solenoid drives the pull-up wheel 56 of Fig. 3 by means of a ratchet arm 66, ratchet wheel 209 with a detent wheel 210 and detent mechanism 211 by which the pull-up wheel is made to turn exactly 1/8 revolution each operation of the solenoid. The solenoid and ratchet arm are restored by a spring 212, and a spring around the pin of the ratchet arm 66, not shown, may be used to cause the ratchet arm to re-engage the ratchet wheel 209 on the reset stroke.

The ratchet wheel 209 which drives the pull-up wheel 56 also drives a disc 213 which may serve as an indicator of the number of pull-ups. As shown, the indication through a hole in the index 214 is zero. Primarily, however, the disc serves to reset the primary relay 158 of Fig. 4, to reset the counters to zero, and to initiate the processing of the pictures, after the fourth pull-up. For this purpose a detent 215 is provided, and a detent switch 216, with a fixed contact 217 connected to the high voltage line 193, and the movable spring arm 218 connected to one end of a winding 219 of a relay 220, the other end of which winding is connected through resistor 221 to ground line 85. After the completion of four cycles of the electronic counter, and four operations of the shutter and pull-up solenoids, so that the latent images have been made and moved into position for processing, the detent 215 comes around at the indication of 4 so that the spring arm 218 of switch 216 is in contact with the contact 217. Current thereupon flows through the relay winding 219 to cause operation of the relay 220. This relay remains closed until the ratchet is again advanced. This is done at a later time by external connection between terminals 205 and 206 which puts positive voltage on the grid of triode 208 to operate the pull-up solenoid, in a manner to be described later.

The relay 220 has three leaves, 221, 222, 223 the first having a front contact 224, and the others having back contacts 225 and 226. These leaves all operate together, being mechanically connected by an insulating bar 227. The armature leaf 221 and its front contact 224 are connected to terminals 228 and 229 for use in starting the processor timer. The second leaf 222 is connected to the counter reset line 181, with junction terminals 182, by which it is connected to the grid return terminals $C_1$, $C_3$, $C_5$, $C_7$ of the odd numbered triodes of the counter. The back contact 225 is connected to the ground line 85. This second assembly is for the purpose of ungrounding the reset line to cause the anodes of the odd numbered counter triodes to draw current while the ratchet index is in the fourth position, which condition will remain after the release of relay 220 to again connect the reset line to ground. The third leaf 223 is connected to terminal 164 and thence to the holding resistor 163 for relay 158, while its back contact 226 is connected through terminal 165 to the front contact tact 162 of relay 148, the armature of which is connected to ground. When the relay 158 operates due to the control signal, the index wheel of the pull-up is at zero, and the relay 220 in the normal condition shown. The relay 158 is then held closed since relay 220 is open, and so continues after the control signal ceases, until the relay 220 operates at the index of four, when the holding current for the relay is broken. This discontinues the pulse train and leaves the relay ready for a later control signal.

Accordingly the detent at the fourth position of the pull-up ratchet provides an electrical signal which can initiate the start of the medium speed processing timer, and also terminates the high speed timer and resets the counter and initiating relay for later actuation.

The circuits of Fig. 5 may be modified in a number of ways in accordance with personal desires of the designer. Thus, primary relays operated by both triodes of the counter MV–7, 8 could be used to control the solenoids; or a relay with a delay slug, as a substitute for resistor 198 could be used to control the solenoid 57; or a three section detent switch could be used in place of single switch 215 and the relay 220.

Figure 6:
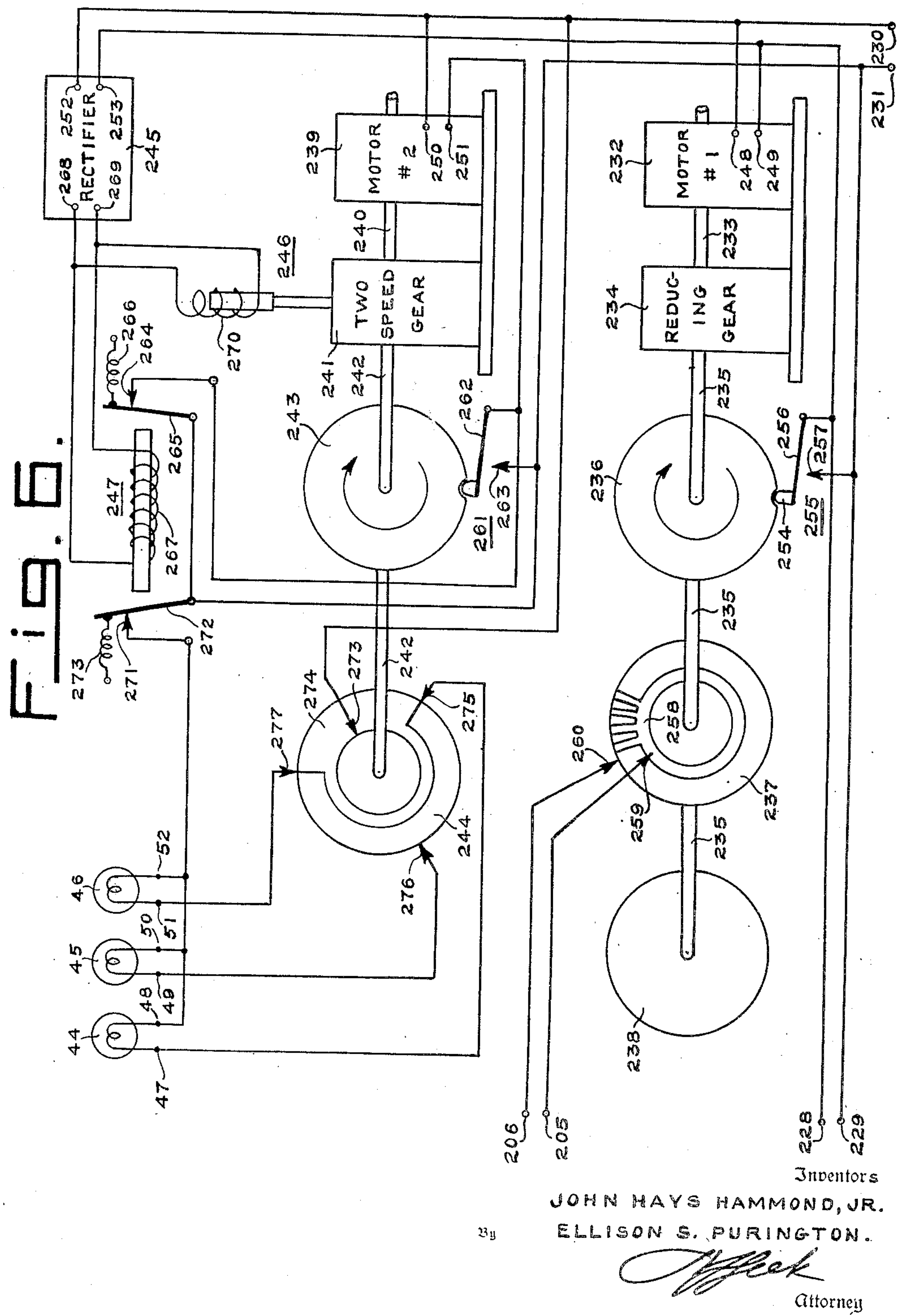
Fig. 6 is a schematic diagram showing further circuits of the receiver in continuation of Fig. 5, mainly relating to the processing and projecting operation of the receiver system.

In Fig. 6 is shown the medium speed timer for processing the latent images left properly in registration at the processing head 39 of Fig. 3, and for pulling up the processed pictures to the projection position to register correctly with the projection lens systems. Also in this figure is shown the low speed timer for controlling the operation of the projection lamps 44, 45, 46. These circuits are powerized from a 60 cycle or other A. C. source externally connected to terminals 230 and 231. Terminals 228 and 229 are connected to similarly numbered terminals of Fig. 5 by conductors not shown.

The medium speed timer includes a self-starting synchronous motor 232 direct coupled by a shaft 233 to a reducing gear set 234, which in turn drives a slow speed shaft 235 on which are mounted three timing discs 236, 237, and 238. Conditions are shown when the motor is at rest.

The slow speed timer includes a self-starting synchronous motor 239, direct coupled by a shaft 240 to a two speed gear set 241, with output shaft 242 on which are mounted a timer disc 243 and a timer disc 244. An A. C. and D. C. converting rectifier 245 actuated when motor 232 is actuated, is used to a gear shifting solenoid 246 and is used to operate a relay 247 for use in resetting the projection timer and blanking out the operation of the projection lamps. Conditions are shown when the slow speed timer is discontinuing the projection of the third picture by extinguishing lamp 46 which projects the third developed picture, and starting the projection of the first picture by energizing the lamp 44.

More specifically, power terminal 230 is connected to terminals 248 and 250 of motors 232 and 239 respectively, and to terminal 252 of the rectifier 245. The energization of these devices is accomplished by switching devices interposed between power terminal 231 and the other terminals 249, 251 and 253 of these devices. However, terminal 253 of the rectifier 245 is direct connected to terminal 249 of the motor 232 so that the rectifier will be actuated whenever the motor 232 is actuated.

Referring now to the medium speed timer driven by motor 232, the timer disc 236 has a detent 254 operating in connection with a detent switch 255 with movable leaf 256 connected to terminal 228 and motor terminal 249, while a front contact 257 is connected to terminal 229 and terminal 231. In the position indicated, the detent switch is open, but is adjusted so that it will be closed when the disc is turned from the indicated position. The motor 232 is started by closure of relay 220 of Fig. 5, thereby connecting terminal 228 to terminal 229. It then continues to turn due to the subsequent closure of the detent switch. Before the completion of a revolution of the disc 236, the relay 220 opens for reasons to be described, so that when the revolution is completed and the detent switch 255 opens, the motor 232 stops to await a subsequent operation of the starting relay 220. In this manner, the medium speed timer is self resetting. The second disc 237 is for actuating the pull-ups of the solenoid 58 of Fig. 5, and for this purpose it is made of insulating material with a four fingered metallic commutator 258 with a brush 259 connected to terminal 205 in contact with commutator 258 at all times. A brush 260 connected to terminal 206 is so placed that it comes in contact with the fingers of the commutator in succession near the end of the revolution of the disc, after the processing of the films shall have been completed. Terminals 205 and 206 are connected to like numbered terminals of Fig. 5, and at each contact current is caused to flow from battery 194 through resistors 204 and 202, thereby sending the grid of power triode 208 positive and causing the solenoid 57 to advance. After the first advance, the detent switch 216 opens and remains open, so that the relay 220 falls out, thereby opening contacts 221 to 224 so that the motor 232 continues to run only due to the closure of detent switch 255. When the detent switch 255 opens at the completion of the revolution, the motor 232 comes to rest, and remains at rest until the next set of pictures is taken and brought into position for processing.

The third disc 236 is for controlling the processing of the film by methods described by Tuttle and Brown in their paper, SMPTE, February 1950, aforementioned, from which it is apparent how the disc 236 and other equipment not shown can be used in developing, fixing, washing and drying the recorded pictures. A timing schedule for this purpose is shown in Fig. 7, together with the schedule for advancing the film to the projection position by the timer wheel 237. In this manner it is apparent how the medium speed timing is carried out and reset.

Referring now to the slow speed timing, making use of motor 239. This drives a detent disc 243 with a detent switch 261 with armature 262 and front contact 263, the former being connected to the motor terminal 251 and to a back contact 264 of relay 247, while the latter is connected to power terminal 231 and to the armature 265 of relay 247, which is normally held against back contact 264 by a spring 266. The motor 239 is driven as long as both the relay 247 is not closed and as long as the detent switch 261 is not open. The relay winding 267 of relay 247 is connected across the output D. C. terminals of rectifier 245, which is powerized only when motor 232 is operating. It is clear, then, that when the processing operation starts, as indicated by energization of the motor 232, the relay 247 closes, thereby opening relay contact 264 to 265. Thereupon the motor 239 will come to rest as soon as the detent switch 261 opens to disconnect motor terminal 251 from power terminal 231. The motor 237 will again be put into operation as soon as the motor 232 stops, thereby indicating the film has been processed and ready for projection. The detent switch provides that the motor 239 will stop just when the lamp timing disc 274 has come to a position for energizing the lamp 44 for projecting the first picture of the set being processed. Accordingly provision is made for first projecting the first picture of a set.

Reference to Fig. 7, it is clear that the projection timer normally makes a revolution in much greater time than the revolution of the process timer. In order to be sure that the motor 239 will come to reset in the position indicated, it is necessary to speed up the rotation of the disc 243 as soon as the motor 232 starts. For this purpose, the speed changing solenoid 246 has its winding 270 connected across the output terminals of the rectifier 245, so that when the motor 232 is powerized, the solenoid 246 operates to change the gear set 241 to drive the timing discs 243 and 244 at slightly higher speed than the disc 236. Under these conditions, the disc 243 will always come around to its detent position sooner than the disc 236 comes to its detent position, so that the projection cycle will always be properly reset to first project the first received picture.

The lamp circuit is controlled by the timer disc 244 in cooperation with the relay 247. The lamps 44, 45 and 46, together with terminals 47 to 52 correspond to similarly numbered devices in Fig. 3. Terminals 48, 50, 52 are joined together and connected to back contact 271 of relay 247, against which armature 272 is normally held by a spring 273. Armature 272 is connected to power terminal 231. However, power terminal 230 is connected to a brush 273 which at all times engages a commutator 274 of timer disc 244, and the lamp terminals 47, 49 and 51 are connected to evenly spaced brushes 275, 276, 277 respectively. The commutator is so fashioned that only one of the brushes 275, 276, 277 makes contact with commutator conductor 274 at a given time. Normally, as the disc 244 turns, the lamps 44, 45, 46 are illuminated in turn to project the three processed pictures in turn and in correct sequence upon the TV news screen 12 of Figs. 1 and 2. However, when the motor 232 is energized, indicating a new set of pictures has been recorded, the relay 247 closes, opening the connection from armature 272 to contact 271 and preventing the illumination of any of the lamps 44, 45, 46 until the motor has stopped.

The blanking out of the TV news material during the processing period is desirable for two reasons. First, in order to reset the projection cycle, the projection timer has to be speeded up, so that there would be insufficient time to read each TV news frame during the speed-up, and therefore, it appears better to discontinue the projection altogether. Secondly, the TV news material may include commercial advertising, which may conflict with other commercial advertising sent over the same television channel. It is contemplated that the TV news will be sent during the changeover from a long program to the interprogram period of the order of forty seconds during which much of short time commercial advertising is presented over the TV program screen 11 of Figs. 1 and 2. By blanking out the TV news screen 12 during this interval, there will be no conflict with other commercial interests using short intervals of commercial time. It is further contemplated that some of the value of the TV news will be to shorten the breaks in the long time programs which are necessary for presentation of extraordinarily important news flashes, or even the complete abandonment. Under such conditions, the TV news material may indicate that it was sent by courtesy of the sponsor of the long time program which furnished the transmission time.

Thus by blanking out the TV news completely, during the short time commercial presentations, and providing for acknowledgment of time supplied during the long time programs, the TV news service can be rendered with the least possible conflict with the sponsors of the TV program material.

This invention therefore, provides for reception of a quick transmission of a considerable quantity of television news information over a standard television channel in a short period of time on the video channel; for timing the recording of this information so that only the desired material will be recorded; for putting the recorded material into position for processing; for resetting the recording mechanism for processing the material and placing the material in position to be displayed on a screen; for resetting this processing cycle; for displaying the information in repeated rotary sequence; for resetting the display cycle; for blanking out the display when a new set of pictures is being processed.

Various modifications of this invention can be made by those skilled in the art. Accordingly the invention is not to be limited to the mechanism of the devices specifically disclosed herein.

What is claimed is:

1. A system for receiving, recording and projecting a series of still pictures received over a television channel during a break in a continuous television program, comprising a television receiver having means responsive to received television signals to produce an image on a television screen, a camera focused on said screen and having means to photograph said image on a sensitized surface said camera having a shutter, a control member connected to trip said shutter for photographing said image, a trip circuit connected to actuate said control member, processing mechanism having means to process said sensitized surface to form a permanent image thereon, stepping mechanism having means to advance said sensitized surface through said camera and into said processing mechanism by an amount to form successive images on successive portions of said surface, a stepping circuit connected to actuate said stepping mechanism, timing means, means controlled by actuation of said timing means, to energize said trip circuit and said stepping circuit in timed sequence to photograph a plurality of images in succession, means controlled by actuation of said timing means to advance said surface after each exposure, means controlled by actuation of said timing means to advance the exposed surfaces into said processing mechanism for processing, means responsive to a predetermined received signal to initiate the operation of said timing means, a second timing means, means controlled by actuation of said second timing means, to control the operation of said processing mechanism and then to actuate said stepping mechanism to advance said processed surfaces out of said processing mechanism, and means actuated by said first timing means to initiate the operation of said second timing means.

2. A system for receiving, recording and projecting a series of still pictures received over a television channel during a break in a continuous television program, comprising a television receiver having means responsive to received television signals to produce an image on a television screen, a camera focused on said screen and having means to photograph said image on a sensitized surface said camera having a shutter, a control member connected to trip said shutter for photographing said image, a trip circuit connected to actuate said control member, processing mechanism having means to process said sensitized surface to form a permanent image thereon, projecting mechanism having means to project an image onto a projection screen, stepping mechanism having means to advance said sensitized surface through said camera, through said focussing mechanism and into said projecting mechanism in sequence, a first timing means, said timing means passing through a cycle upon actuation thereof, means to actuate said trip circuit and said stepping mechanism in timed sequence to photograph a plurality of images in succession, means to advance said sensitized surface after each exposure and to advance the exposed surfaces into said processing mechanism, means responsive to a predetermined signal received over said television channel to initiate the operation of said timing mechanism, a second timing means, means controlled by actuation of said second timing means to pass through a cycle to control said processing mechanism for processing said exposed surface and to advance the processed surface into said projecting mechanism, means responsive to said first timing means to initiate the operation of said second timing means, a third timing means having means to control said projecting mechanisms to project said images in sequence onto a screen, and means responsive to said second timing means to initiate the operation of said third timing means.

3. A system as claimed in claim 2 in which said projecting mechanism includes means projecting said images in timed sequence in a repeated cycle.

4. A system as claimed in claim 2 in which said projecting mechanism comprises a plurality of projecting stations each having a light source focussed on said screen and spaced to project a plurality of images from successive positions on said surface and said third timing means includes means successively energizing said sources so as to project said images in timed sequence.

5. A system as claimed in claim 2 in which said projecting mechanism comprises a plurality of projecting stations each having a light source focussed on said screen and spaced to project a plurality of images from successive positions on said surface and said third timing means includes means successively energizing said sources so as to project said images in timed sequence and in a repeated cycle.

6. A system as claimed in claim 2 in which said first timing means comprises an electronic counter, and said second and third timing means each comprise an electric meter and contact members actuated thereby.

7. A system as claimed in claim 2 in which said first timing means comprises an electronic counter, and said second and third timing means each comprise an electric meter and contact members actuated thereby, said meters being adapted to drive said contact members at different speeds whereby the projecting cycle comes a longer period of time than said processing cycle.

8. A system as claimed in claim 7 in which means is provided responsive to the initiation of said processing cycle to interrupt said projection light sources and to cause said projection cycle meter to operate at an increased rate until it reaches a point at the beginning of a projection cycle.

JOHN HAYS HAMMOND, Jr.
ELLISON S. PURINGTON.

References Cited in the file of this patent

UNITED STATES PATENTS

| Number | Name | Date |
|---|---|---|
| 2,174,490 | Somers | Sept. 26, 1939 |
| 2,275,898 | Goldsmith | Mar. 10, 1942 |
| 2,373,114 | Goldsmith | Apr. 10, 1945 |
| 2,420,029 | Brady | May 6, 1947 |
| 2,504,734 | Schmidling | Apr. 18, 1950 |
| 2,565,366 | Gray | Aug. 21, 1951 |